United States Patent Office 3,337,396
Patented Aug. 22, 1967

3,337,396
METHOD OF COMBATTING FUNGI
Harvey W. Spurr, Jr., Raleigh, N.C., assignor to Union
Carbide Corporation, a corporation of New York
No Drawing. Filed Feb. 9, 1966, Ser. No. 526,029
1 Claim. (Cl. 167—22)

The present invention relates to novel fungicidal compositions. More particularly, this invention relates to fungicidal compositions comprising 2-methyl-2-(methylthio)propionaldehyde O-(methylcarbamoyl)oxime and to the use of 2-methyl-2-(methylthio)propionaldehyde O-(methylcarbamoyl)oxime in the control of fungi.

Fungi such as the powdery mildew which attack greenhouse plants and agricultural crops are generally controlled commercially by applying a topical spray to the subject plant. Topical spraying, however, does not provide a lasting protection against fungi and, consequently, frequent reapplication is required. The cost of such reapplication is apparent and considerable effort has been expended to find a satisfactory systemic fungicide, i.e. a fungicide which, when applied to the soil in which the subject plant is growing, will be taken into the vascular system of the plant and thereby provide lasting protection against fungal growth. Although several compounds have heretofore been suggested for use as systemic fungicides, none has provided satisfactory protection when applied at economically feasible rates.

We have now found that 2-methyl-2-(methylthio)propionaldehyde O-(methylcarbamoyl)oxime is highly suitable as a fungicide. It is particularly useful as a systemic fungicide in the control of powdery mildew affecting greenhouse plants and agricultural crops. This discovery obviates the need for the costly reapplication of topical sprays which has heretofore characterized the commercial control of fungal growth on such plants. Moreover, the use of the systemic fungicidal compositions of this invention substantially reduces the hazards to the applicator which are associated with topical spray application techniques.

Thus, in accordance with the present invention there are provided fungicidal compositions comprising 2-methyl - 2-(methylthio)propionaldehyde O - (methylcarbamoyl)oxime. 2-methyl-2-(methylthio)propionaldehyde O-(methylcarbamoyl)oxime is a known compound which can be readily prepared in accordance with the method taught in U.S. Patent 3,217,037.

The choice of the particular carrier used in conjunction with the 2-methyl-2-(methylthio)propionaldehyde O-(methylcarbamoyl)oxime is not critical and the carrier can be either liquid or solid. Suitable liquid carriers include water, petroleum distillates or other liquid carriers which may be used with or without surface active agents. Liquid concentrates can be prepared by dissolving the active compound with a solvent such as toluene, xylene or kerosene and dispersing the toxicant in water with the aid of suitable surface acive dispersing agents. The choice of dispersing and emulsifying agent and the amount employed is dictated by the nature of the composition and the ability of the agent to facilitate the dispersion of the toxicant compound. Dispersing and emulsifying agents which may be employed include the condensation products of alkylene oxides with phenols and organic acids, alkyl aryl sulfonates, complex ether alcohols, mahogany soaps, sodium, potassium or calcium alkylaryl sulfonates, and quaternary ammonium compounds.

In the preparation of wettable powder or dust compositions, the active ingredient is dispersed in and on a finely divided inert solid carrier such as clay, talc, chalk, bentonite, fuller's earth, and the like. In the formulation of the wettable powders the aforementioned dispersing agents can also be included.

The concentration of 2-methyl-2-(methylthio)propionaldehyde O-(methylcarbamoyl)oxime in the fungicidal compositions is not narrowly critical. When a liquid carrier is employed, the concentration of 2-methyl-2-(methylthio)propionaldehyde O - (methylcarbamoyl)oxime will generally range from about 5 percent to about 50 percent by weight of the final formulation whereas concentrations of from about 0.5 to 95 percent by weight can be effectively employed when a solid carrier is used. In general, the optimum concentration to be employed in any given formulation must be determined in view of the efficiency with which the equipment used for application can uniformly scatter the formulation over the area to be treated.

The fungicidal compositions can be applied according to methods known to those skilled in the art. Spraying or dusting techniques can be used effectively. It is preferred that the surface soil be turned over following application thereto.

The application rate, i.e. the amount of formulation applied per acre, is dependent upon the concentration of 2-methyl-2-(methylthio)propionaldehyde O - (methylcarbamoyl)oxime in the formulation. In general, the application rate should be such that from about 1.0 to 50 pounds, preferably from 3.0 to 30.0 pounds, of 2-methyl-2-(methylthio)propionaldehyde O - (methylcarbamoyl)oxime will be uniformly distributed per acre.

The fungicidal compositions of this invention are highly suitable for controlling mildew growth on a wide variety of plants. For example, control of powdery mildew disease of apples, peaches, pears, apricots, grapes, strawberries, cucurbits, nursery stock, ornamentals, trees, shrubs and roses, all of which are ordinarily susceptible to fungal attack can be conveniently accomplished in accordance with the present invention. The use of the fungicidal compositions can be either preventive or remedial, i.e. they can be effectively used to control the fungi which has already attacked the subject plant or they can be used to prevent infection of the subject plant.

The following examples illustrate the systemic fungicidal activity of 2-methyl-2-(methylthio)propionaldehyde O-(methylcarbamoyl)oxime. Unless otherwise indicated, "parts" refers to parts by weight.

EXAMPLE I

A test formulation was prepared by dissolving one part of 2-methyl-2-(methylthio)propionaldehyde O-(methylcarbamoyl)oxime in 1000 parts of a 1.0% acetone solution of an alkylphenoxy polyethoxyethanol surfactant, as an emulsifying or dispersing agent, and diluting the resulting solution with 9000 parts of water. The test solution thus contained approximately 100 parts of 2-methyl-2-(methylthio)propionaldehyde O - (methylcarbamoyl)oxime per million parts of formulation. The test plants were young rose plants (*Rosa setigera* Michx.) which were growing in soil contained in 4-inch clay pots and which had been infected with powdery mildew caused by the fungus *Sphaerotheca humuli* (DC.) or *Sphaerotheca pannosa* (Wallr.) Lév. Fifty milliliters of the test solution were applied to the soil in which each of the test plants were growing and the plants were then held at 68° C. and 50 percent relative humidity for about three months during which time the new growth of the plants which had been treated with test solution was almost completely free of powdery mildew growth. In contrast, control plants which were treated in an identical manner except that no 2-methyl-2-(methylthio)propionaldehyde O-(methylcarbamoyl)oxime was contained in the formulation became heavily infected with powdery mildew.

EXAMPLE II

The test plants were young apple seedlings (*Malus sylvestris* Mill.) growing in 4-inch clay pots. Fifty milliliters of test solution containing 100 parts of 2-methyl-2-(methylthio)propionaldehyde O - (methylcarbamoyl)oxime per million parts of formulation (prepared as described in Example I) were applied to the soil in which each of the test plants was growing. The thus treated specimens and untreated controls were then dusted with powdery mildew spores from apple seedlings which had been infected with the fungus *Podosphaera leucotricha* Salm. or *Podosphaera oxyacanthae* (DC.) d' By. The plants were then incubated for three weeks under conditions favoring powdery mildew infection. The new growth of apple seedlings treated with 2-methyl-2-(methylthio)propionaldehyde O - (methylcarbamoyl)oxime was free of powdery mildew infection whereas the untreated control plants were heavily infected.

What is claimed is:

A method of combating fungi which comprises contacting said fungi with a fungicidally effective amount of 2-methyl-2-(methylthio)propionaldehyde O - (methylcarbamoyl)oxime.

References Cited

UNITED STATES PATENTS 3,217,037  11/1965  Payne _____ 167—22
3,255,076   6/1966  Weil _____ 167—39

ALBERT T. MEYERS, *Primary Examiner.*

JULIAN S. LEVITT, *Examiner.*

STANLEY J. FRIEDMAN, *Assistant Examiner.*